United States Patent
Christodorescu et al.

(10) Patent No.: US 9,823,843 B2
(45) Date of Patent: Nov. 21, 2017

(54) MEMORY HIERARCHY MONITORING SYSTEMS AND METHODS

(71) Applicant: QUALCOMM Incorporated, San Diego, CA (US)

(72) Inventors: Mihai Christodorescu, San Jose, CA (US); Satyajit Prabhakar Patne, San Diego, CA (US); Sumita Rao, San Diego, CA (US); Vikram Nair, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 14/806,842

(22) Filed: Jul. 23, 2015

(65) Prior Publication Data

US 2017/0024135 A1    Jan. 26, 2017

(51) Int. Cl.
*G06F 11/00* (2006.01)
*G06F 12/14* (2006.01)
*G06F 12/16* (2006.01)
*G08B 23/00* (2006.01)
*G06F 3/06* (2006.01)
*G06F 21/55* (2013.01)

(52) U.S. Cl.
CPC .......... *G06F 3/0604* (2013.01); *G06F 3/0653* (2013.01); *G06F 3/0683* (2013.01); *G06F 21/552* (2013.01)

(58) Field of Classification Search
CPC ............. H04L 63/1433; H04L 63/1425; G06F 21/577; G06F 2221/033; G06F 2221/034
USPC ......................................................... 726/25
See application file for complete search history.

(56) References Cited

U.S. PATENT DOCUMENTS

| 7,725,934 B2 | 5/2010 | Kumar et al. |
| 7,886,291 B1 | 2/2011 | Jones et al. |
| 8,607,344 B1 | 12/2013 | Libenzi et al. |

(Continued)

FOREIGN PATENT DOCUMENTS

WO      2015094189 A1      6/2015

OTHER PUBLICATIONS

International Search Report and Written Opinion—PCT/US2016/038664—ISA/EPO—dated Oct. 7, 2016.

*Primary Examiner* — Kambiz Zand
*Assistant Examiner* — Stephen Sanders
(74) *Attorney, Agent, or Firm* — The Marbury Law Group, PLLC

(57) ABSTRACT

Systems, methods, and devices of the various aspects enable identification of anomalous application behavior by monitoring memory accesses by an application running on a computing device. In various aspects, a level of memory access monitoring may be based on a risk level of an application running on the computing device. The risk level may be determined based on memory address accesses of the application monitored by an address monitoring unit of one or more selected memory hierarchy layers of the computing device. The memory hierarchy layers selected for monitoring for memory address accesses of the application may be based on the determined risk level of the application. Selected memory hierarchy layers may be monitored by enabling one or more address monitoring units (AMUs) associated with the selected one or more memory hierarchy layers. The enabling of selected AMUs may be accomplished by an AMU selection module.

26 Claims, 7 Drawing Sheets

(56) References Cited

U.S. PATENT DOCUMENTS

| | | |
|---|---|---|
| 8,955,107 B2 | 2/2015 | Eyada |
| 2004/0205419 A1 | 10/2004 | Liang et al. |
| 2015/0128262 A1 | 5/2015 | Glew et al. |
| 2016/0117498 A1* | 4/2016 | Saxena ................. G06F 21/445 726/23 |
| 2016/0285903 A1* | 9/2016 | Hinchliffe ........... H04L 63/1425 |

* cited by examiner

MEMORY HIERARCHY MONITORING SYSTEMS AND METHODS

BACKGROUND

Portable electronics, computing devices, and communication devices offer a wide array of features and services that provide their users with unprecedented levels of access to information, resources, and communications. To provide such services, a computing device may execute one or more applications on the device, and may communicate with one or more communication networks, typically to send and/or receive information for the one or more applications. Computing devices that provide advanced information services are increasingly ubiquitous, and are increasingly relied on to perform important security-sensitive operations that may involve the confidential or sensitive information (e.g., credit card information, contacts, etc.). Monitoring the integrity of such computing devices for malfunctions and malicious attacks is increasingly important.

Security-sensitive operations may correspond to the execution of one or more code threads (for example, calling a sensitive API, or reading sensitive data from a peripheral device). In one method of monitoring execution events, a processor may monitor a CPU instruction stream to identify execution of a specific address in a memory. This method may be precise, but may be complicated to implement and may be unnecessarily resource intensive. In another method of monitoring execution events, the processor may monitor a cache access stream to identify a statue of a specific address in a memory. This method may be efficient, but may be inaccurate due to CPU pre-fetching optimizations. Further, neither of these known methods may be adjusted dynamically to account for, among other things, the accuracy of the measurements, or the efficiency with which the measurements may be made.

SUMMARY

Systems, methods, and devices of various aspects enable a processor of a computing device to monitor a memory hierarchy by a processor of a computing device by determining a risk level of an application running on the computing device based on memory address accesses of the application monitored by an address monitoring unit of one or more selected memory hierarchy layers of the computing device, and selecting one or more memory hierarchy layers to monitor the memory address accesses of the application based on the determined risk level of the application. In an aspect, determining a risk level of an application running on the computing device based on memory address accesses of the application monitored by an address monitoring unit of one or more selected memory hierarchy layers of the computing device may include receiving from the address monitoring unit memory access events characterizing memory accesses by the application running on the computing device, and determining the risk level of the application based on the received memory access events.

In an aspect, determining a risk level of an application running on the computing device may include receiving context information related to memory access events characterizing memory accesses by the application running on the computing device, and determining the risk level of the application based on the context information. In an aspect, selecting one or more memory hierarchy layers to monitor the memory address accesses of the application based on the determined risk level of the application may include enabling one or more address monitoring units of the selected one or more memory hierarchy layers to monitor the memory address accesses of the application based on the determined risk level of the application.

In an aspect, determining a risk level of an application running on a computing device may include generating a behavior vector based on the memory address accesses of the application, applying one or more classifier models to the generated behavior vector, and determining the risk level of the application based on a result of applying the one or more classifier models to the generated behavior vector. In an aspect, generating a behavior vector based on the memory address accesses of the application may include generating a behavior vector based on context information related to the memory accesses of the application.

In an aspect, determining a risk level of an application running on the computing device based on memory address accesses of the application monitored by an address monitoring unit of one or more selected memory hierarchy layers of the computing device may include receiving context information related to memory access events characterizing memory accesses by the application running on the computing device, and inferring unobserved memory accesses of the application based on the memory address events and the received context information. In an aspect, determining a risk level of an application running on the computing device based on memory address accesses of the application monitored by an address monitoring unit of one or more selected memory hierarchy layers of the computing device may include receiving context information related to memory access events characterizing memory accesses by the application running on the computing device, and inferring unobserved application behavior based on the memory address events and the received context information.

Further aspects include a computing device including a processor configured with processor-executable instructions to perform operations of the aspect methods described above. Further aspects include a non-transitory processor-readable storage medium having stored thereon processor-executable software instructions configured to cause a processor to perform operations of the aspect methods described above. Further aspects include a computing device that includes means for performing functions of the operations of the aspect methods described above.

BRIEF DESCRIPTION OF THE DRAWINGS

The accompanying drawings, which are incorporated herein and constitute part of this specification, illustrate exemplary aspects, and together with the general description given above and the detailed description given below, serve to explain the features of the various aspects.

DETAILED DESCRIPTION

Figure 1:
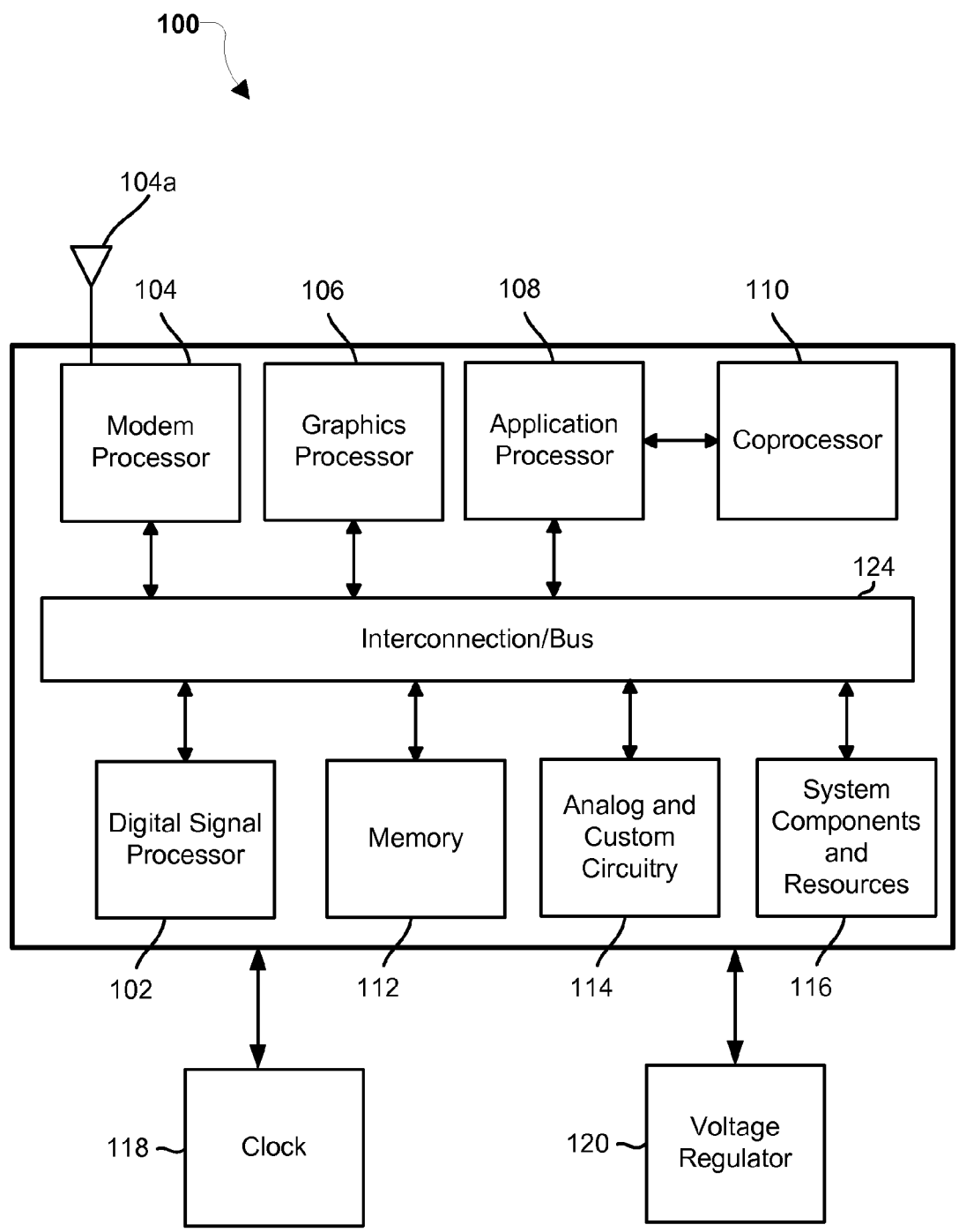
FIG. 1 is an architectural diagram illustrating an example computing device in the form of a system-on-chip that may be used to implement the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the various aspects or the claims.

The various aspects include methods, and computing devices and systems configured to implement the methods, of monitoring and analyzing the behavior of an application running on a computing device by detecting, by a processor of the computing device, network communication activity of the application, and determining whether the application is behaving anomalously using analysis of memory accesses of memory tiers that are adjusted based on assessed risk levels in order to match analysis overhead appropriate to risk.

The terms "computing device," "mobile device," and "communication device" are used interchangeably herein to refer to any one or all of cellular telephones, smartphones, personal or mobile multi-media players, personal data assistants (PDAs), laptop computers, tablet computers, smartbooks, ultrabooks, palmtop computers, wireless electronic mail receivers, multimedia Internet enabled cellular telephones, wireless gaming controllers, and similar personal electronic devices which include a memory and a programmable processor.

The terms "component," "module," "system" and the like are used herein to refer to a computer-related entity, such as, but not limited to, hardware, firmware, a combination of hardware and software, software, or software in execution, which are configured to perform particular operations or functions. A module For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Mobile computing devices that provide advanced information services are increasingly ubiquitous, and are increasingly relied on to perform important security-sensitive operations that may touch on the confidential or sensitive information (e.g., credit card information, contacts, etc.). Security-sensitive operations may correspond to the execution of one or more code threads (for example, calling a sensitive API, or reading sensitive data from a peripheral device). Thus, there is a need for monitoring systems and software that protection computing devices and sensitive data from malware and misappropriation. However, mobile computing devices have limited processing and power resources, and therefore there is a need to balance the overhead investing in security systems implemented in such devices against the relative risk posed to systems, software, and data.

In the various aspects, a computing device behavioral analysis system may dynamically adjust a level of monitoring of a memory hierarchy based on a risk level of an application, and may detect a behavioral anomaly of the application based on the monitoring of the memory hierarchy. In some aspects, a processor of a computing device may analyze the behavior of an application running on the computing device, and may utilize the behavioral analysis system to determine a risk level of the application. The device processor may activate or deactivate a monitor of memory address accesses, such as an address monitoring unit (AMU), based on the level of risk identified by the behavioral analysis system. The behavioral analysis system may dynamically determine (and periodically redetermine) the risk level of the application. Based on the determined risk level of the application, the behavioral analysis may activate memory access monitoring to an appropriate or corresponding level within the memory hierarchy. The behavioral analysis system may then detect a behavioral anomaly or non-benign behavior of the application based on monitoring memory accesses within the determined levels of the memory hierarchy.

In some aspects, the behavioral analysis system may determine a risk level of an application running on the computing device by obtaining information about application behavior from a context determination module and information from a plurality of levels of memory hierarchy. The memory may be organized into or include a plurality of levels or layers, such as a central processing unit (CPU) cache, a level zero (L0) cache, a level one (L1) cache, a level two (L2) cache, dynamic random access memory (DRAM), etc. The behavioral analysis engine may obtain information about memory accesses at one or more of the levels of memory hierarchy from a monitoring unit (e.g., an AMU) by activating an AMU associated with a memory hierarchy level. When access monitoring is activated, each activated AMU may provide to the context determination module information regarding memory accesses of its respective memory hierarchy layer. This information may be in the form of memory access events characterizing memory accesses by the application running on the computing device.

The context determination module may also obtain information about other operating system events related to the application. Application behavior may thus include accesses to one or more of the layers of the memory hierarchy that may be correlated with context information about operating system events related to the memory accesses.

The context determination module may provide memory access events, other operating system event information, and/or a confidence level (i.e., a level of accuracy) to a behavioral security engine. The behavioral security engine may determine a risk level of the application using one or more elements of the information provided from the context determination module.

In some aspects, the behavioral analysis engine may activate an AMU associated with a memory hierarchy level based on the determined risk level of the application. Activating an AMU may cause the AMU to monitor application activity in the selected memory layer(s) and report memory access activity to a behavior observer module. Activating an AMU based on the determined level of risk of the application enables the behavioral analysis system to balance accuracy of behavior analysis conclusions from memory access monitoring against the overhead and resource utilization imposed by monitoring the selected memory hierarchy layer(s). The more layers of memory that are monitored the more data is provided for analysis and thus better the assessment/analysis of application behavior. However, this improvement in the assessment or analysis of application behavior comes at a price in terms of device resource utilization, power drain, and performance because the increase in memory access data available for analysis requires more processing by the behavior analysis system. For example, monitoring a memory layer closer to the CPU (e.g., L0 or L1 cache) provides more accurate information, but requires more system resources and processing overhead, whereas monitoring a memory layer farther away from the CPU cache (e.g., L3 or DRAM) requires fewer system resources, but provides relatively less accurate information.

In some aspects, the behavioral analysis engine may dynamically redetermine the risk level of the application and reselect one or more memory hierarchy layers for monitoring as the determined risk level changes. As activity of the application running on the computing device changes, the risk level of its activities may change. By dynamically reselecting memory hierarchy layers for monitoring as the risk level changes, the behavioral analysis system may conserve resources as risks decline and increase the level of scrutiny and confidence as the risk increases.

In some aspects, the behavioral analysis engine may infer information about the behavior of the application to increase the accuracy of information obtained from higher-level memory hierarchy layers (e.g., L3 cache or DRAM). For example, a context collector module (or another software module or other module) may obtain operating system context information and/or analyze a memory state of the computing device (e.g., by obtaining information from or about a memory stack, or a memory heap), and may infer (i.e., compute) information about unobserved memory accesses of the application (i.e., in a memory hierarchy layer that may not be monitored). The behavioral analysis engine may also infer additional application behavior using, for example, operating system context information and/or information about accesses to or provided by memory hierarchy layers that may not be actively monitored. The behavioral analysis engine may determine (or redetermine) the risk level of the application using the inferred additional information about the application behavior. The behavioral analysis engine may then identify behavioral anomalies or non-benign behaviors of the application based on monitoring memory access of the selected memory hierarchy layer(s).

The various aspects may be implemented in a number of different computing devices, including single processor and multiprocessor systems, and a system-on-chip (SOC). FIG. 1 is an architectural diagram illustrating an example SOC 100 architecture that may be used in computing devices and systems implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8). The modem processor 104 may communicate with an antenna 104a to enable the sending and receiving of radio communications, e.g., with another device or with a communication network.

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device. The system components 116 and custom circuitry 114 may include circuitry to interface with peripheral devices, such as cameras, electronic displays, wireless communication devices, external memory chips, etc. The processors 102, 104, 106, and 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth, WLAN, Wi-Fi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
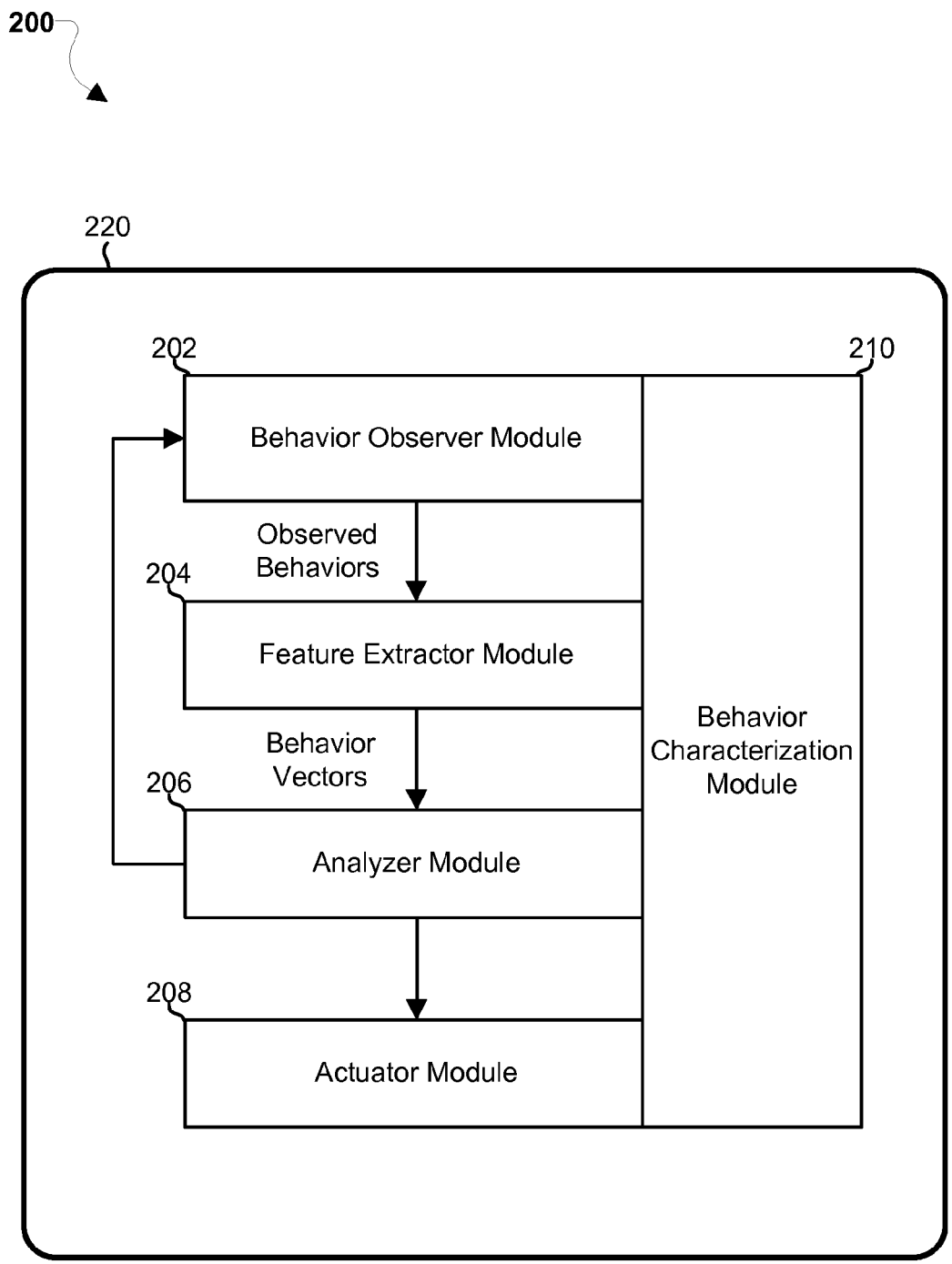
FIG. 2 is a block diagram illustrating example logical components and information flows in an application behavior characterization system.

FIG. 2 illustrates example logical components and information flows in an aspect computing device 200 that includes an application behavior characterization system 220 configured to use behavioral analysis techniques to characterize behavior of an application in accordance with the various aspects. In the example illustrated in FIG. 2, the computing device includes a device processor (e.g., any of the processors 102, 104, 106, 108, 110 of FIG. 1) configured with executable instruction modules that include a behavior observer module 202, a feature extractor module 204, an analyzer module 206, an actuator module 208, and a behavior characterization module 210.

The behavior observer module may be configured to obtain observations of memory accesses and information about other behaviors of an application (e.g., network communication activity, messaging, instructions, memory accesses, requests, data transformations, priorities of processes (i.e., real time, best effort, etc.), process identifiers, thread identifiers, a number or percentage of resources used to process an instruction or thread, a number of processing cores used to process and instruction or thread, input or output (i.e., I/O) activity, and other application behavior). The behavior observer module may collect the observations and behavior information pertaining to the application, as well as the additional information about the computing device, and may store the collected information in a memory (e.g., in a log file, etc.). The feature extractor module may use the collected observations and behavior information pertaining to the application and the additional information about the computing device to generate a representation of such information in the form of one or more behavior vectors. The analyzer module may compare the generated behavior vectors to one or more classifier models to evaluate the behavior of the application, to characterize the application behaviors, and to determine whether the observed behaviors indicate that the application is behaving anomalously. In some aspects, the analyzer module may also determine a category of an application. The actuator module may initiate or recommend an action to modify an application behavior response to a determination that the application is behaving anomalously.

Each behavior vector may be a data structure or an information structure that includes or encapsulates one or more features. A behavior vector may include an abstract number or symbol that represents all or a portion of observed application behavior (i.e., a feature). Each feature may be associated with a data type that identifies a range of possible values, operations that may be performed on those values, the meanings of the values, and other similar information. The data type may be used by the behavior characterization system to determine how the corresponding feature (or feature value) should be measured, analyzed, weighted, or used.

In an aspect, the behavior characterization system may be configured to generate a behavior vector of size "n" that maps the observer real-time data into an n-dimensional space. Each number or symbol in the behavior vector (i.e., each of the "n" values stored by the vector) may represent the value of a feature. The behavior characterization system may analyze the behavior vector (e.g., by applying the behavior vector to a model of various categories of applications to evaluate the behavior of the observed application. In some aspects, the behavior characterization system may also combine or aggregate the behavior scores of all application behavior and/or device states, for example, into an average behavior score, a weighted average behavior score, or another aggregation. In some aspects, one or more weights may be selected based on a feature of observed behavior.

In an aspect, the behavior characterization system may be configured to store models of various categories of applications. A model of an application category may identify one or more features of observable behavior of an application category that may indicate the application is behaving anomalously. In some aspects, models of application category behavior may be stored in a cloud server or network, shared among a large number of devices, sent to each communication device periodically or on demand, and customized in the behavior characterization system based on observed behaviors of the application. One or more models of application behavior may be, or may be included, in a classifier model. In some aspects, the behavioral analysis system may adjust the size of a behavior vector to change the granularity of features extracted from the application behavior.

By generating classifier models in the behavior characterization system in which the models are used, the various aspects allow each computing device to accurately identify the specific features that are most important in determining and characterizing a particular observed application's memory accesses and other behavior based on the particular application behaviors that are observable by the behavior characterization system. These aspects may also allow each computing device to accurately prioritize the features in the classifier models in accordance with their relative importance to classifying behaviors of the application.

Based on the comparison of the generated behavior vectors to the one or more classifier models, the behavioral analysis system of each communication device may initiate an action. In some aspects, the action may modify the behavior of the application in response to determining that the application is behaving anomalously. In some aspects, the action may serve to limit or stop any behavior or aspect of the application.

In various aspects, all or portions of the behavior characterization module 210 may be implemented as part of the behavior observer module 202, the feature extractor module 204, the analyzer module 206, or the actuator module 208. Each of the modules 202-210 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the module 200.

The behavior characterization module 210 may be configured to characterize the memory accesses and other behavior of an application, generate at least one behavior vector based on the observed application's behavior, compare the application's behavior vector with at least one classifier model, and to determine based on the comparison of the at least one behavior vector to the at least one classifier model whether the application is behaving anomalously. The behavior characterization module 210 may use the information collected by the behavior observer module 202 to determine behaviors of the application, and to use any or all such information to characterize the behavior of the application.

The behavior observer module 202 may monitor the activities of the application by monitoring memory accesses to one or more layers of the memory hierarchy of the computing device (e.g., a CPU cache, L0 cache, L1 cache, L2 cache, DRAM, etc.), which may include read operations, write operations, store operations, queries, commands, messages, instructions, and other memory operations. The behavior observer module 202 may also correlate such observed behavior with context information related to the observed memory operations of the application, which may include process identifiers, priorities of processes (i.e., real time, best effort, etc.), thread identifiers, a number or percentage of resources used to process an instruction or thread, a number of processing cores used to process and instruction or thread, input or output (i.e., I/O) activity, performance information (number of memory access events per CPU cycle, latency of event delivery, and other performance information), and other application behavior such as messaging, instructions, memory accesses, requests, data transformations, network communication activity, and other application behavior. The behavior observer module 202 may also monitor the activities of the application by monitoring the system resource usage, which may include monitoring a number of forks, memory access operations, number of files open, etc.

The number of observable behavioral elements of an application may be relatively large. To reduce the number of behavioral elements monitored to a manageable level, in an aspect, the behavior observer module 202 may be configured to perform coarse observations by monitoring or observing an initial set of behaviors or factors that are a small subset of all observable behaviors of an application. In some aspects, the behavior observer module 202 may receive the initial set of behaviors and/or factors from a server and/or a component in a cloud service or network. In some aspects, the initial set of behaviors/factors may be specified in machine learning classifier models.

The behavior observer module 202 may communicate (e.g., via a memory write operation, function call, etc.) the collected observed behavior data to the feature extractor module 204. The feature extractor module 204 may be configured to receive or retrieve (e.g., from the behavior observer module, or from memory storage such as from a log file), the observed behavior data and use this information to generate one or more behavior vectors. Each behavior vector may succinctly describe the observed behavior data in a value or vector data-structure. In some aspects, the vector data structure may include a series of numbers, each of which signifies a partial or complete representation of the application behavior data collected by the behavior observer module 202.

In some aspects, the feature extractor module 204 may be configured to generate the behavior vectors so that they function as an identifier that enables the behavioral analysis system (e.g., the analyzer module 206) to quickly recognize, identify, or analyze the application behavior data. In an aspect, the feature extractor module 204 may be configured to generate behavior vectors of size "n," each of which maps the application behavior into an n-dimensional space. In an aspect, the feature extractor module 204 may be configured to generate the behavior vectors to include information that may be input to a feature/decision node in the behavior characterization module to generate an answer to a query regarding one or more features of the behavior data to characterize the behavior of the application.

The feature extractor module 204 may communicate (e.g., via a memory write operation, function call, etc.) the generated behavior vectors to the analyzer module 206. The analyzer module 206 may be configured to apply the behavior vectors to classifier modules to characterize the observed behaviors of the computing device executing the application, e.g., as within normal operating parameters, or as anomalous. In addition, the analyzer module 206 may be configured to apply the behavior vectors to classifier modules to characterize the behaviors of the computing device executing the application.

Each classifier model may be a behavior model that includes data and/or information structures (e.g., feature vectors, behavior vectors, component lists, etc.) that may be used by, e.g., by a processor of the computing device, to evaluate a specific feature or aspect of the observed behavior data. Each classifier model may also include decision criteria for monitoring a number of features, factors, data points, entries, messages, instructions, memory calls, states, conditions, behaviors, processes, operations, components, etc. (herein collectively "features") of the application. The classifier models may be preinstalled on the computing device, downloaded or received from a network server, generated in the computing device, or any combination thereof. The classifier models may be generated by using behavior modeling techniques, machine learning algorithms, or other methods of generating classifier models.

In some aspects, a classifier model specific to a category or categories of an application may be used, which is a classifier model that includes a focused data model that includes/tests only observed application category-specific features/entries that are determined to be most relevant to evaluating the behavior of the application. By dynamically generating observed application-specific classifier models locally in the behavior monitoring system, the various aspects allow the computing device to focus monitoring and analysis operations on a small number of features that are most important, applicable, and/or relevant for evaluating the behavior of the observed application.

In an aspect, the analyzer module 206 may be configured to adjust the granularity or level of detail of the features of the observed application behavior that the analyzer module evaluates, such as when an analysis features of observed application behavior is inconclusive. For example, the analyzer module 206 may be configured to notify the behavior observer module 202 in response to determining that it cannot characterize a behavior of the application. In response, the behavior observer module 202 may change the factors or behaviors that are monitored and/or adjust the granularity of its observations (i.e., the level of detail, type and/or number of features, and/or the frequency at which the application's behavior is observed) based on a notification sent from the analyzer module 206 (e.g., a notification based on results of the analysis of the observed behavior features).

The behavior observer module may also observe new or additional application behaviors, and send the new/additional observed behavior data to the feature extractor module 204 and the analyzer module 206 for further analysis/classification. Such feedback communications between the behavior observer module 202 and the analyzer module 206 may enable the application behavior characterization system 220 to recursively increase the granularity of the observations (i.e., make more detailed and/or more frequent observations) or change the real-time data that are observed until the analyzer module can evaluate and characterize behavior of an observed application to within a range of reliability or up to a threshold level of reliability. Such feedback communications may also enable the behavior characterization system 220 to adjust or modify the behavior vectors and classifier models without consuming an excessive amount of the computing device's processing, memory, or energy resources. In some aspects, behavior characterization system may also reduce or restrict a number and/or type of features that are observed and analyzed based on other device conditions, such as a battery level (e.g., a battery level above or below a threshold), a network connection speed (e.g., a data rate and/or available/achievable bandwidth), a processing speed of the processor in the computing device (e.g., an available/achievable processing speed, or whether a number of processed/queued threads is above or below a threshold).

The computing device may use a full classifier model to generate a family of lean classifier models of varying levels of complexity (or "leanness"). The leanest family of lean classifier models (i.e., the lean classifier model based on the fewest number of test conditions) may be applied routinely until the analyzer module determines that it cannot reliably characterize the behavior of the application. In response to such determination, the analyzer module may provide feedback (e.g., a notification or instruction) to the behavior observer module and/or the feature extractor module to use ever more robust classifier models within the family of generated lean classifier models, until a definitive characterization of the application behavior can be made by the analyzer module. In this manner, the behavior characterization system 220 may strike a balance between efficiency and accuracy by limiting the use of the most complete, but resource-intensive classifier models to those situations where a robust classifier model is needed to definitively characterize the behavior of the observed application.

In various aspects, the computing device may be configured to generate lean classifier models by converting a representation or expression of observed behavior data included in a full classifier model into boosted decision stumps. For example, the computing device may prune or cull the full set of boosted decision stumps based on specific features of the observed application's behavior to generate a lean classifier model that includes a subset of boosted decision stumps included in the full classifier model. The computing device may then use the lean classifier model to intelligently monitor and characterize the observed application's behavior. Boosted decision stumps are one-level decision trees that may have one node (i.e., one test question or test condition) and a weight value, and may be well suited for use in a light, non-processor intensive binary classification of data/behaviors. Applying a behavior vector to boosted decision stump may result in a binary answer (e.g., 1 or 0, yes or no, etc.). For example, a question/condition tested by a boosted decision stump may include whether an application is sending or receiving information over a communication network, or whether an application is making use of a device hardware component such as a camera, the answers to which may be binary. Boosted decision stumps are efficient because they do not require significant processing resources to generate the binary answer. Boosted decision stumps may also be highly parallelizable, and thus many stumps may be applied or tested in parallel/at the same time (e.g., by multiple cores or processors in a module, computing device, or system).

In various aspects, the device processor may dynamically generate application-specific classifier models that identify conditions or features that are relevant to a specific software application and/or to a specific type of software application that may be security-sensitive (e.g., banking, financial, document creating and editing, productivity, contacts and other personal information handlers, etc.). In various aspects, such classifier models may be generated to include a reduced and more focused subset of the decision nodes that are included in the full classifier model or of those included in lean classifier model generated from the received full classifier model. In various aspects, the device processor may be configured to generate application-based classifier models for each software application in the system and/or for each category of software application in the system. In various aspects, device processor may be configured to generate the application-based classifier models dynamically, reactively, proactively, and/or every time a new application is installed or updated.

Figure 3:
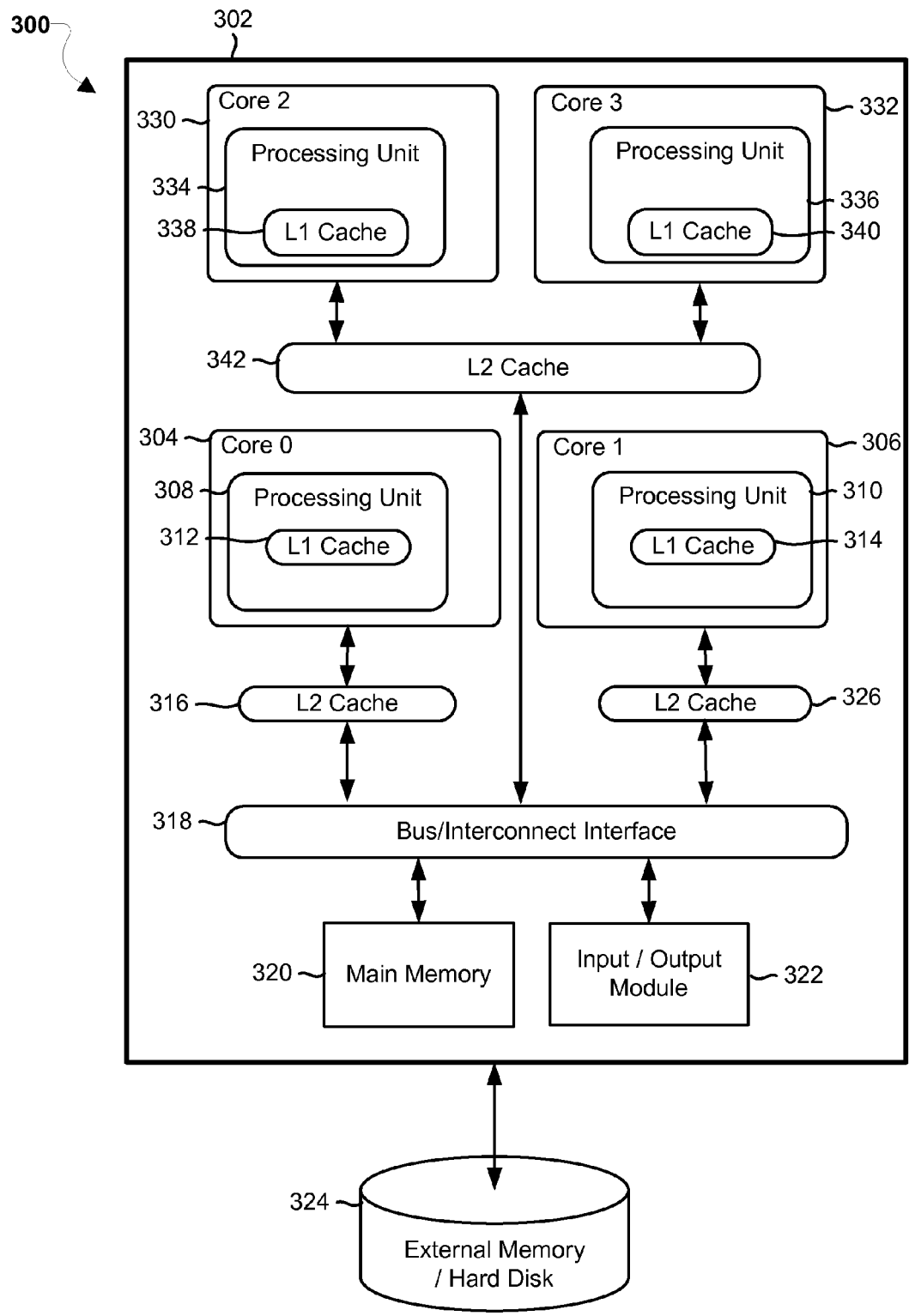
FIG. 3 is a functional block diagram illustrating an aspect multicore processor architecture that may be used to implement the various aspects.

FIG. 3 illustrates an example multicore processor architecture 300 that may be used to implement the various aspects. The multicore processor 302 may include two or more independent processing cores 304, 306, 330, 332 in close proximity (e.g., on a single substrate, die, integrated chip, etc.). The proximity of the processing cores 304, 306, 330, 332 allows memory to operate at a much higher frequency/clock-rate than is possible if the signals have to travel off-chip. The proximity of the processing cores 304, 306, 330, 332 allows for the sharing of on-chip memory and resources (e.g., voltage rail), as well as for more coordinated cooperation between cores. While four processing cores are illustrated in FIG. 3, it will be appreciated that this is not a limitation, and a multicore processor may include more or fewer processing cores.

The multicore processor 302 may include a multi-level cache that includes Level 1 (L1) caches 312, 314, 338, and 340 and Level 2 (L2) caches 316, 326, and 342. While only two levels of memory cache (L1 and L2) are illustrated in FIG. 3, the multicore processor architecture may include additional levels of memory hierarchy, such as a CPU cache, a DRAM cache, and L3 cache, and other memory hierarchy levels. The multicore processor 302 may also include a bus/interconnect interface 318, a main memory 320, and an input/output module 322. The L2 caches 316, 326, 342 may be larger (and slower) than the L1 caches 312, 314, 338, 340, but smaller (and substantially faster) than a main memory unit 320. Each processing core 304, 306, 330, 332 may include a processing unit 308, 210, 334, 336 that has private access to an L1 cache 312, 314, 338, 340. The processing cores 304, 306, 330, 332 may share access to an L2 cache (e.g., L2 cache 342) or may have access to an independent L2 cache (e.g., L2 cache 316, 326).

The L1 and L2 caches (and other memory caches, if present) may be used to store data frequently accessed by the processing units, whereas the main memory 320 may be used to store larger files and data units being accessed by the processing cores 304, 306, 330, 332. The multicore processor 302 may be configured so that the processing cores 304, 306, 330, 332 seek data from memory in order, first querying the L1 cache, then L2 cache, and then the main memory if the information is not stored in the caches. If the information is not stored in the caches or the main memory 320, the multicore processor 202 may seek information from an external memory and/or a hard disk memory 224.

Figure 4:
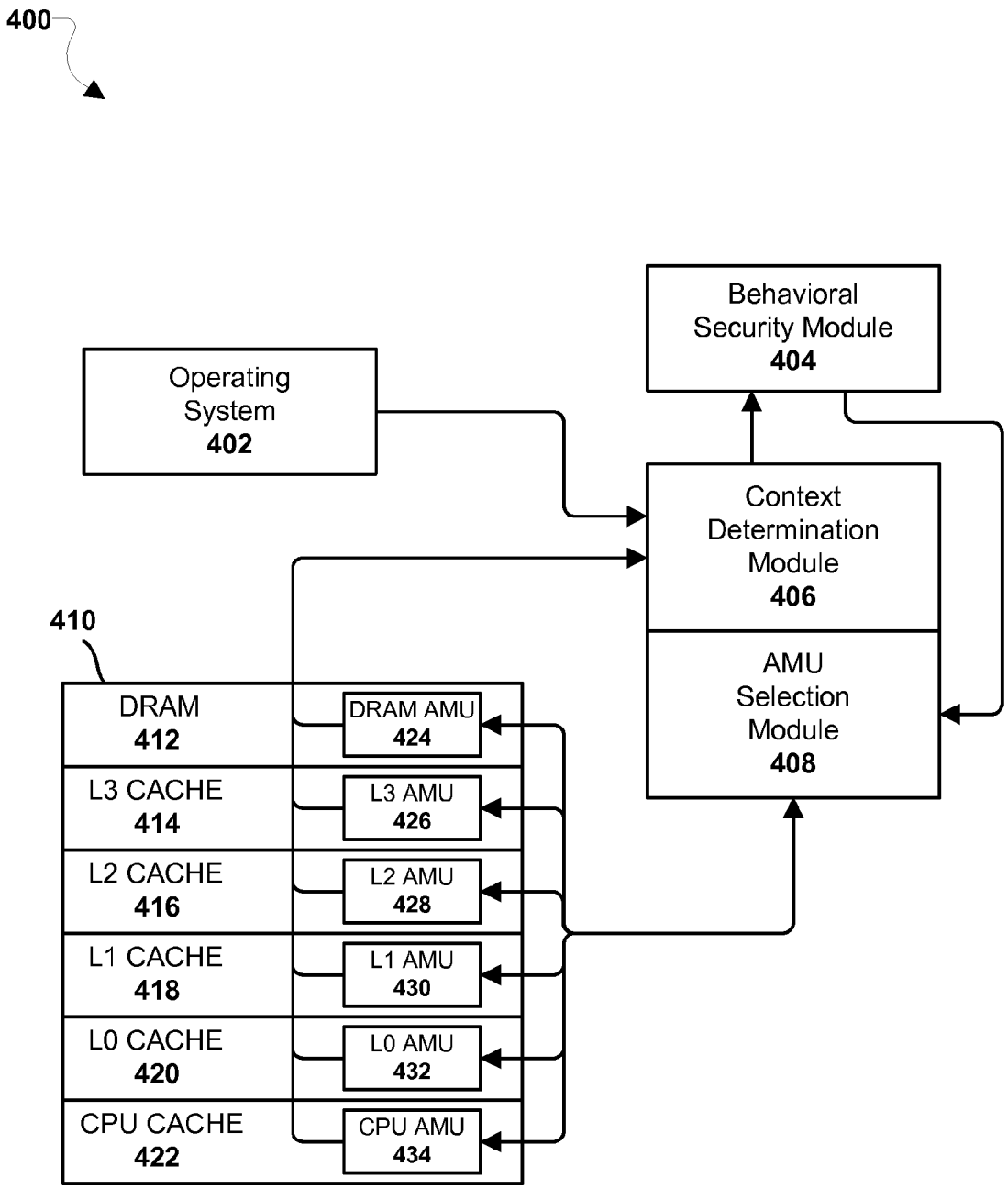
FIG. 4 is a functional block diagram illustrating an aspect memory architecture that may be used to implement the various aspects.

FIG. 4 illustrates an example memory architecture 400 that may be used to implement the various aspects. The memory architecture may include an operating system 402, a behavioral security module 404, a context termination module 406, an AMU selection module 408, and a memory hierarchy 410. The memory architecture may be utilized by the SOC 100 (see FIG. 1), the computing device 200 (see FIG. 2), the multicore processor architecture 300 (see FIG. 3), or another computing device or architecture.

The memory hierarchy 410 may include one or more memory hierarchy layers, including DRAM 412, L3 cache 414, L2 cache 416, L1 cache 418, L0 cache 420, and CPU cache 422. Each memory hierarchy layer may include an address monitoring unit (AMU), such as DRAM AMU 424, L3 AMU 426, L2 AMU 420, L1 AMU 430, L0 AMU 432, and CPU AMU 434. Each AMU may be a hardware component in communication with memory circuitry of its respective memory hierarchy layer (i.e., DRAM, L3 cache, etc.).

An AMU may monitor requests received by the memory hierarchy layer to perform a memory operation (e.g., a read operation, a write operation, store operation, or another memory operation) at a memory location (e.g., a memory address). An AMU may be configurable to monitor one or more addresses or address types, including virtual and/or physical addresses. In some aspects, an AMU may passively monitor the memory accesses of its memory hierarchy layer.

An AMU may generate memory access event when any of its monitored addresses are accessed. The generated memory access event may characterize a memory access by the application with information such as the type of operation, the specific command, performance data related to the type of operation, an address or range of addresses, and other information related to the memory access. Each AMU may provide the generated memory access event(s) to the context determination module, e.g., via an interrupt, or via an on-chip debugging mechanism. An AMU may provide the memory access event(s) upon request from the context determination module, or in response to detecting the event, or upon another appropriate trigger event.

The operating system may also provide the context determination module (and/or the context determination module may obtain from the operating system) with context information that may be related to each of the memory access events reported by the AMU(s) to the context determination module.

The context information may include one or more process identifiers, priorities of processes (i.e., real time, best effort, etc.), thread identifiers, a number or percentage of resources used to process an instruction or thread, a number of processing cores used to process an instruction or thread, input or output (i.e., I/O) activity, performance information (number of memory access events per CPU cycle, latency of event delivery, and other performance information), and other application behavior such as messaging, instructions, memory accesses, requests, data transformations, network communication activity, and other application behavior.

The context determination module may correlate the memory access events from the AMU(s) and the context information from the operating system. In some aspects, the context determination module may annotate the memory access events with the context information to generate the correlation.

AMUs other than the CPU AMU may monitor a subset of all of the memory accesses of the application. As a memory hierarchy layer's distance from the CPU increases, the number of memory accesses that the AMU may monitor decreases (i.e., AMUs far from the CPU may monitor a smaller subset of the application's memory accesses than AMUs closer to the CPU). Thus, the accuracy of information related to memory accesses and context typically increases when memory hierarchy layers closer to the CPU are monitored, and decreases when memory hierarchy layers farther from the CPU are monitored.

In some aspects, the context determination module may compute one or more confidence levels of the event information and/or context information based on the memory hierarchy layer of the AMU(s) from which the event information is received, or to which the context information is related. The context determination module may include the one or more computed confidence levels together with the context information, and may provide the computed confidence level(s) to the behavioral security module 404.

The behavioral security module 404 may obtain or receive the event information and/or context information from the context determination module, and may determine a risk level of the application based on the event information and/or context information. In some aspects, the behavioral security module 404 may utilize a behavioral analysis system, such as the application behavior characterization system 220 (see FIG. 2).

The behavioral security module 404 may determine and dynamically adjust a risk level of an application based on memory accesses made to and from the memory hierarchy 410 by the application, as well as context information related to the memory accesses. In some aspects, the behavioral security module 404 may generate one or more behavior vectors based on the memory access events and/or context information, and may compare the behavior vector(s) to one or more classifier models to evaluate the behavior of the application and to determine a risk level of the application.

The behavioral security module 404 may send or provide the determined risk level to the AMU selection module 408. In some aspects, the behavioral security module 404 may also provide additional information about the memory access events and/or context information. Using the determined risk level and or the information about the memory access events and/or context information, the AMU selection module 408 may select one or more memory hierarchy layers for monitoring. The AMU selection module 408 may send a message, command, or another instruction to an AMU of the selected one or more memory hierarchy layers to enable (or disable) the AMU of the selected memory hierarchy layer(s) to monitor memory accesses. For example, the AMU selection module 408 may select the CPU cache 422 for monitoring, and may send an instruction enabling the CPU AMU 434 to monitor memory accesses of the CPU cache 422. In some aspects, the AMU selection module 408 may utilize a behavioral analysis system, such as the application behavior characterization system 220 (see FIG. 2). In some aspects, the AMU selection module 408 may generate one or more behavior vectors based on the memory access events, context information, and/or determined risk level of the application, and may compare the behavior vector(s) to one or more classifier models to select one or more layers of the memory hierarchy for memory access monitoring.

In some aspects, as the risk level computed by the behavioral security engine increases, the behavioral analysis system may increase the accuracy of the monitoring of application behaviors. The accuracy of information related to memory accesses and context typically increases when memory hierarchy layers closer to the CPU are monitored. For example, monitoring the CPU cache 422 via the CPU AMU 434 may provide the most accurate information regarding memory accesses, while monitoring the DRAM 412 via the DRAM AMU 444 may provide the least accurate information regarding memory accesses. Monitoring accuracy may increase toward the CPU because the AMU of each memory hierarchy layer closer to the CPU may monitor a larger subset of all memory accesses of the application. For example, the CPU AMU may typically monitor all memory accesses, the L0 AMU may monitor fewer memory accesses than the CPU AMU, the L1 AMU may monitor fewer memory accesses than the L0 AMU, and so forth. However, obtaining increased accuracy by monitoring memory hierarchy layers closer to the CPU also requires increased processor overhead and power consumption, and thus the accuracy of memory hierarchy monitoring may typically be balanced against the costs assessed against processor utilization and power storage. Accordingly, the AMU selection module 408 may continuously monitor the determined risk level of the application as well as performance overhead, and may selectively enable and or disable AMUs associated with various memory hierarchy levels as the determined risk changes.

Thus, the context determination module may continuously obtain event information from one or more AMUs and/or context information from the operating system, and may provide the event information and/or context information to the behavioral security module 404. The behavioral security module 404 may dynamically determine (and redetermine) the risk level of the application, and may provide the redetermined risk level of the application to the AMU selection module 408. The AMU selection module 408 may activate or deactivate one or more AMUs based on the level of risk computed by the behavioral analysis system and/or performance information related to the impact of monitoring application behavior at the one or more memory hierarchy layers. The behavioral analysis system may detect behavioral anomalies and non-benign behaviors of the application based on the monitoring of memory accesses of the memory hierarchy.

Figure 5:
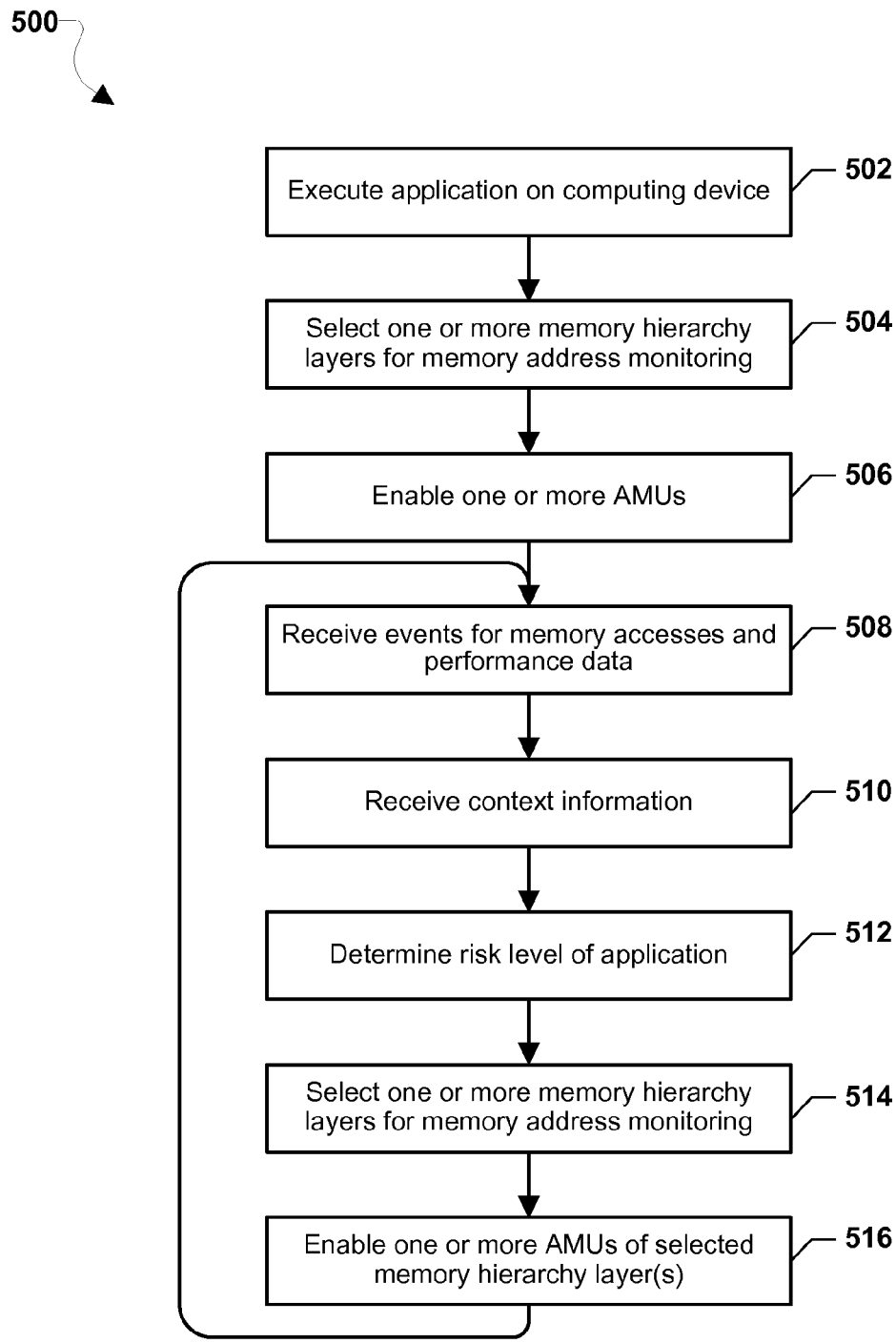
FIG. 5 is a process flow diagram illustrating an aspect method of monitoring a memory hierarchy of a computing device in accordance with the various aspects.

FIG. 5 illustrates a method 500 of monitoring memory accesses at various levels within a memory hierarchy of a computing device in accordance with the various aspects. The method 500 may be performed by a processing core or device processor, such as a processor on a system-on-chip (e.g., processors 102, 104, 106, 108, and 110 on the SOC 100 illustrated in FIG. 1) or any similar device processor, and may employ a behavioral analysis system (e.g., the behavior characterization system 220 in FIG. 2) to observe and characterize behaviors of an application by monitoring memory accesses at one or more memory hierarchy layers and obtaining context information related to the monitored memory accesses.

In block 502, the processor may execute an application on the computing device. The application may perform one or more security-sensitive operations related to, for example confidential or sensitive information of a user. In block 504, the processor may initially select one or more memory hierarchy layers for memory address monitoring, and in block 506 the processor may enable one or more AMUs to monitor memory accesses of the selected one or more memory hierarchy layers. For example, the processor may initially select one or more of layers 412-422 and may enable one or more of the corresponding AMUs 424-434 to monitor memory accesses of the respective memory hierarchy layer(s).

In block 508, the processor may receive memory access events for memory accesses related to behaviors of the application. For example, the context determination module 406 may obtain event information from the one or more enabled AMUs 424-434. In block 510, the processor may receive context information related to the memory accesses. For example, the context determination module 406 may obtain context information related to the event information from the operating system 402.

In block 512, the processor may determine a risk level of the application. In some aspects, the processor may determine the risk level of the application based on memory address accesses of the application monitored by one or more AMUs. For example, the behavioral security module 404 may obtain event information and/or context information from the context determination module 406, and may compute a risk level of the application based on the event information and/or context information. In some aspects, the behavioral security module 404 may utilize a behavioral analysis system, such as the application behavior characterization system 220.

In block 514, the processor may select one or more memory hierarchy layers for memory address monitoring. In some aspects, the processor may select the one or more memory hierarchy layers based on the determined risk level of the application, as well as based on the context information and/or performance information (such as a performance impact to the computing device based on which memory hierarchy layer(s) are selected for monitoring). For example, based on the risk level of the application determined by the behavioral security module 404, the processor may select one or more memory hierarchy layers for memory address monitoring. In some aspects, the AMU selection module 408 may utilize a behavioral analysis system, such as the application behavior characterization system 220, to determine which AMU(s) to enable or disable based on the determined risk level of the application and performance information.

In block 516, the processor may cause the AMU selection module 408 to enable one or more AMUs of the selected memory hierarchy layer or layers. For example, the AMU selection module 408 may send a message, command, or another instruction to an AMU of the selected one or more memory hierarchy layers to enable the AMU of the selected memory hierarchy layer(s) to monitor memory accesses, and further may send a message, command, or another instruction to disable an AMU of a previously-selected memory hierarchy layer that may no longer be monitored.

The processor may repeat the operations of blocks 508-516 to continuously and dynamically determine the risk level of the application, and activate or deactivate one or more AMUs based on the computed level of risk of the application, context information, and/or performance information related to the impact of monitoring application behavior at the one or more memory hierarchy layers.

Figure 6:
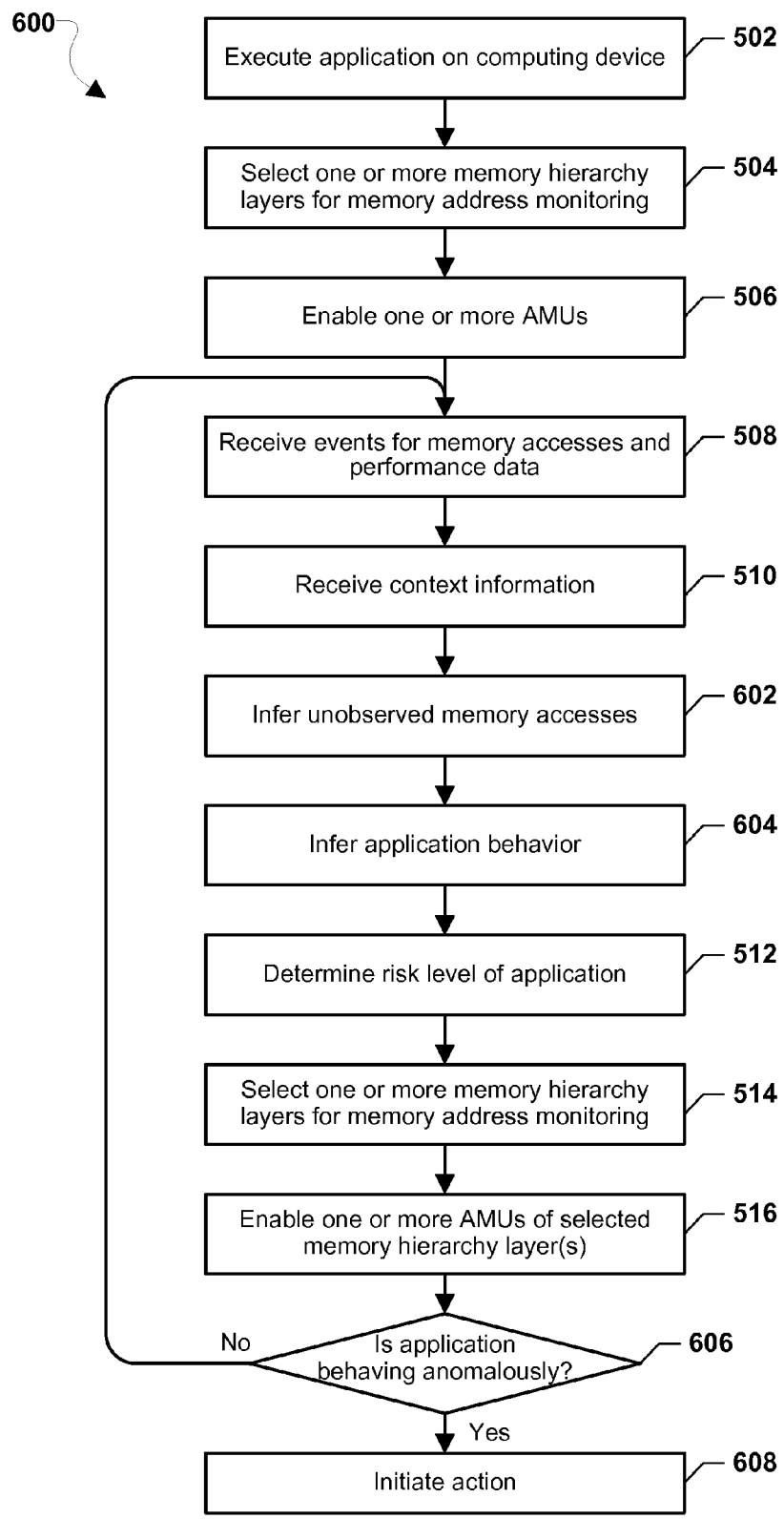
FIG. 6 is another process flow diagram illustrating an aspect method of monitoring a memory hierarchy of a computing device in accordance with the various aspects.

FIG. 6 illustrates a method 600 of monitoring a memory hierarchy of a computing device in accordance with the various aspects. The method 600 may be performed by a processing core or device processor of a module, such as a processor on a system-on-chip (e.g., any of the processors 102, 104, 106, 108, and 110 on the SOC 100 illustrated in FIG. 1) or any similar device processor, and may employ a behavioral analysis system to observe and characterize behaviors of an observed module (e.g., the behavior characterization system 220 in FIG. 2). In some aspects the device processor may perform operations in blocks 502-516 similar to those described with reference to blocks 502-516 of the method 500 (see FIG. 5).

In block 602, the processor may infer unobserved memory accesses by the application running on the computing device. Unobserved memory accesses may be memory accesses performed by the application on one or more memory hierarchy layers that are not being monitored (e.g., on which an AMU has not been enabled). For example, the processor may receive context information related to memory access events (i.e., memory accesses by the application), and based on the context information the processor may infer unobserved memory accesses by the application on one or more on monitor memory hierarchy layers. Context information may include process identifiers, priorities of processes (i.e., real time, best effort, etc.), thread identifiers, a number or percentage of resources used to process an instruction or thread, a number of processing cores used to process and instruction or thread, input or output (i.e., I/O) activity, performance information (number of memory access events per CPU cycle, latency of event delivery, and other performance information), and other application behavior such as messaging, instructions, memory accesses, requests, data transformations, network communication activity, and other application behavior.

The processor may also analyze a memory state (e.g., a stack state or heap state) for indicators of one or more execution paths of instructions, commands, messages, threads, processes, or other aspects of the behavior of the application. For example, AMUs of memory hierarchy layers other than the CPU layer (e.g., the L0 AMU, the L1 AMU, etc.) may monitor only a subset of all of the memory accesses by the application running on the computing device. To provide additional accuracy to monitored memory accesses, which may not be all of the memory accesses of the application, the processor may infer unobserved memory accesses by analyzing additional application behavior information. For example, the processor may analyze information from a memory stack, which may provide information about processor and/or device functions that the application may be utilizing and/or attempting to utilize. As another example, the processor may analyze information from a memory heap, which may provide information about, for example, how many times a loop is traversed. Thus, the processor may use additional information related to application behaviors, and based on the additional application behavior information the processor may infer unobserved memory accesses by the application on one or more on monitor memory hierarchy layers.

In block 604, the processor may infer application behavior by using information that is provided from unmonitored memory hierarchy layers. For example, a memory cache (e.g., the L0 cache, the L1 cache, etc.) may make available runtime statistics about memory accesses they receive. In some aspects, the context determination module may receive the additional information that is provided by the unmonitored memory hierarchy layers (e.g., directly from each cache, or provided by the operating system). Based on the additional information provided from the unmonitored memory hierarchy layers, the processor may infer application behavior, and may use the inferred application behavior to improve the accuracy of the monitored memory accesses and other information that may not represent all of the memory accesses and other behavior of the application running on the computing device. For example, a memory cache may include one or more cache counters (e.g., the L0 cache may include an L0 I-counter), and the memory cache may provide information from the one or more cache counters to the context determination module and/or operating system. The processor may use the information provided by the one or more cache counters, in addition to the event information and/or context information, to determine a likely or probable execution path of application instructions, commands, messages, processes, threads, etc. Further, the processor may use the probable execution path of the application together with the event information and/or context information to improve a confidence level of the memory access events, context information, or correlation of the memory access events and the context information.

In determination block 606, the processor may determine whether the application is behaving anomalously or exhibiting non-benign behavior. For example, the processor may make this determination based on an analysis of the received memory access events and/or context information (which may include a behavioral analysis). In some aspects, the context information may include inferred an observed memory accesses and or inferred application behavior.

In response to determining that the application is not behaving anomalously (i.e., determination block 606="No"), the processor may repeat the operations of blocks 508-516 as described above to continuously and dynamically determine the risk level of the application, and activate or deactivate one or more AMUs based on the computed level of risk.

In response to determining that the application is behaving anomalously (i.e., determination block 606="Yes"), the processor may take an action to modify the application behavior in block 608. In some aspects, the processor may take action to limit or stop a behavior, instruction, command, message, process, thread, or other activity of the application.

Figure 7:
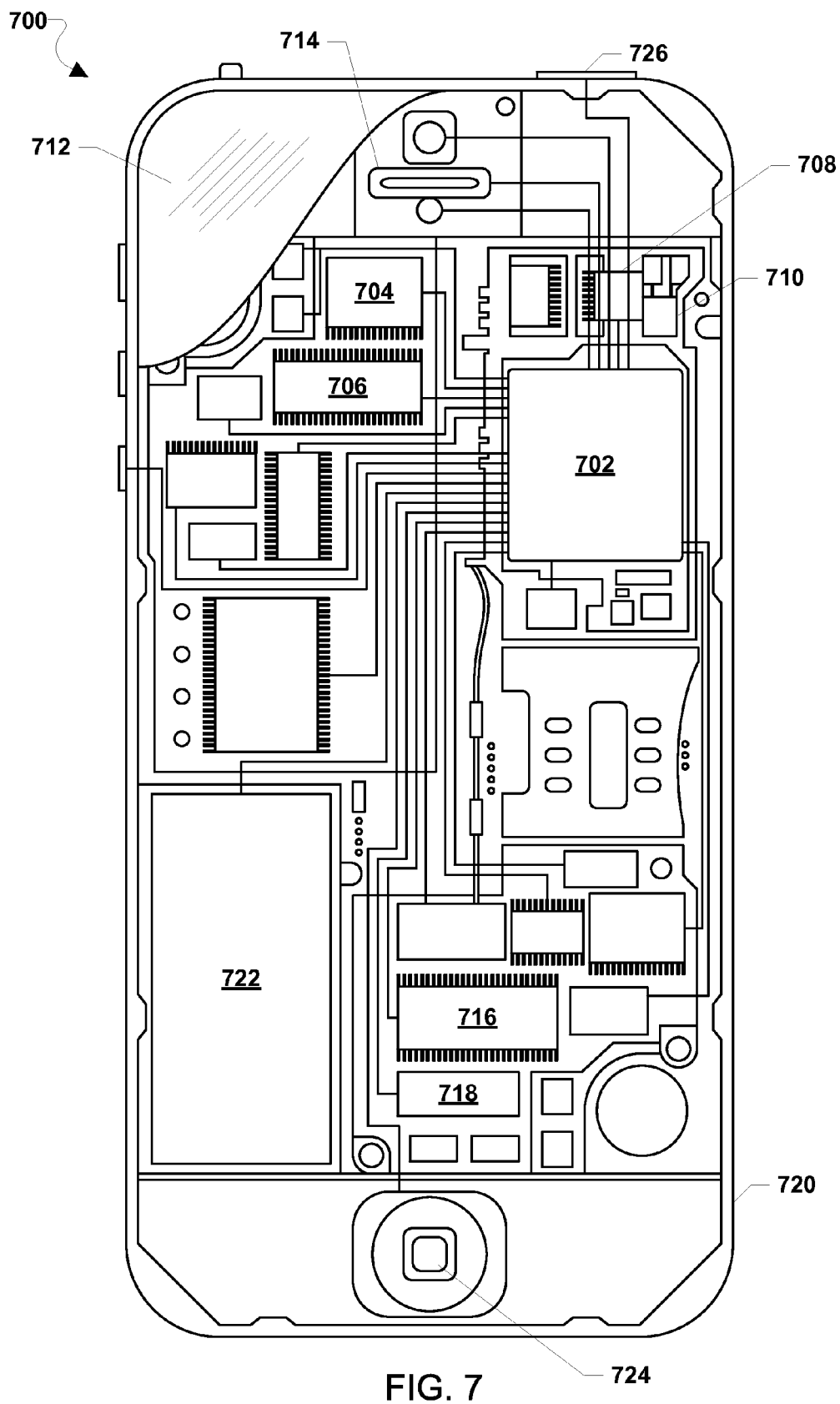
FIG. 7 is a component block diagram of an example mobile device suitable for use with various aspects.

The various aspects, including the aspects discussed above with reference to FIGS. 1-6, may be implemented on a variety of computing devices, an example of which is the mobile communication device 700 illustrated in FIG. 7. The mobile computing device 700 may include a processor 702 coupled to internal memory 704, a display 712, and to a speaker 714. The processor 702 may be one or more multi-core integrated circuits designated for general or specific processing tasks. The internal memory 704 may be volatile or non-volatile memory, and may also be secure and/or encrypted memory, or unsecure and/or unencrypted memory, or any combination thereof. The mobile communication device 700 may have two or more radio signal transceivers 708 (e.g., Peanut, Bluetooth, Zigbee, Wi-Fi, RF radio, etc.) and antennae 710 for sending and receiving communications, coupled to each other and to the processor 702. Additionally, the mobile communication device 700 may include an antenna 710 for sending and receiving electromagnetic radiation that may be connected to a wireless data link and/or transceiver 708 coupled to the processor 702. The mobile communication device 700 may include one or more cellular network wireless modem chip(s) 716 coupled to the processor 702 and antennae 710 that enable communications via two or more cellular networks via two or more radio access technologies.

The mobile communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown). The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The processor 702 may be any programmable microprocessor, microcomputer or multiple processor chip or chips that can be configured by software instructions (applications) to perform a variety of functions, including the functions of various aspects described below. In some mobile communication devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions. In various aspects, the processor 712 may be a device processor, processing core, or an SOC (such as the example SOC 100 illustrated in FIG. 1).

In an aspect, the mobile communication device 700 may include an SOC, and the processor 702 may be one of the processors included in the SOC (such as one of the processors 102, 104, 106, 108, and 110 illustrated in FIG. 1).

Computer code or program code for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the various aspects are not intended to be limited to the aspects shown herein but is to be accorded the widest scope consistent with the following claims and the principles and novel features disclosed herein.

What is claimed is:

1. A method of monitoring a memory hierarchy by a processor of a computing device, comprising:
   determining a risk level of an application running on the computing device based on memory address accesses by the application of one or more computing device memory hierarchy layers that are each monitored and characterized by a respective address monitoring unit associated with the one or more selected computing device memory hierarchy layers and context information that is correlated with the memory address accesses; and
   selecting one or more of the computing device memory hierarchy layers for monitoring by the respective address monitoring unit of the memory address accesses by the application based on the determined risk level of the application.

2. The method of claim 1, wherein determining a risk level of an application running on the computing device based on memory address accesses by the application of one or more computing device memory hierarchy layers that are each monitored and characterized by the respective address monitoring unit associated with the one or more computing device memory hierarchy layers and context information that is correlated with the memory address accesses comprises:

receiving from the address monitoring unit memory access events characterizing memory accesses by the application running on the computing device; and determining the risk level of the application based on received memory access events.

3. The method of claim 1, wherein selecting one or more of the computing device memory hierarchy layers for monitoring by the respective address monitoring unit of the memory address accesses by the application based on the determined risk level of the application comprises:

enabling one or more address monitoring units of the selected one or more computing device memory hierarchy layers to monitor the memory address accesses of the application based on the determined risk level of the application.

4. The method of claim 1, wherein determining a risk level of an application running on a computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

generating a behavior vector based on the memory address accesses of the application;

applying one or more classifier models to the generated behavior vector; and determining the risk level of the application based on a result of applying the one or more classifier models to the generated behavior vector.

5. The method of claim 4, wherein generating a behavior vector based on the memory address accesses of the application comprises generating a behavior vector based on context information related to the memory accesses of the application.

6. The method of claim 1, wherein determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

inferring unobserved memory accesses of the application based on the memory address events and the received context information.

7. The method of claim 1, wherein determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

inferring unobserved application behavior based on the memory address events and the received context information.

8. A mobile computing device, comprising:

a processor configured with processor-executable instructions to perform operations comprising:

determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses; and selecting one or more of the computing device memory hierarchy layers for monitoring by the respective address monitoring unit of the memory address accesses by the application based on the determined risk level of the application.

9. The mobile computing device of claim 8, wherein the processor is configured with processor-executable instructions to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

receiving from the address monitoring unit memory access events characterizing memory accesses by the application running on the computing device; and determining the risk level of the application based on received memory access events.

10. The mobile computing device of claim 8, wherein the processor is configured with processor-executable instructions to perform operations such that selecting one or more of the computing device memory hierarchy layers for monitoring by the respective address monitoring unit of the memory address accesses by the application based on the determined risk level of the application comprises:

enabling one or more address monitoring units of the selected one or more computing device memory hierarchy layers to monitor the memory address accesses of the application based on the determined risk level of the application.

11. The mobile computing device of claim 8, wherein the processor is configured with processor-executable instructions to perform operations such that determining a risk level of an application running on a computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

generating a behavior vector based on the memory address accesses of the application;

applying one or more classifier models to the generated behavior vector; and determining the risk level of the application based on a result of applying the one or more classifier models to the generated behavior vector.

12. The mobile computing device of claim 11, wherein the processor is configured with processor-executable instructions to perform operations such that generating a behavior vector based on the memory address accesses of the application comprises generating a behavior vector based on context information related to the memory accesses of the application.

13. The mobile computing device of claim 8, wherein the processor is configured with processor-executable instructions to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
    inferring unobserved memory accesses of the application based on the memory address events and the received context information.

14. The mobile computing device of claim 8, wherein the processor is configured with processor-executable instructions to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
    inferring unobserved application behavior based on the memory address events and the received context information.

15. A non-transitory processor-readable storage medium having stored thereon processor-executable software instructions configured to cause a processor to perform operations for monitoring a memory hierarchy by a processor of a computing device, comprising:
    determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses; and
    selecting one or more of the computing device memory hierarchy layers for monitoring by the respective address monitoring unit of the memory address accesses by the application based on the determined risk level of the application.

16. The non-transitory processor-readable storage medium of claim 15, wherein the stored processor-executable software instructions are configured to cause a processor to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
    receiving from the address monitoring unit memory access events characterizing memory accesses by the application running on the computing device; and
    determining the risk level of the application based on received memory access events.

17. The non-transitory processor-readable storage medium of claim 15, wherein the stored processor-executable software instructions are configured to cause a processor to perform operations such that selecting one or more of the computing device memory hierarchy layers for monitoring by the respective address monitoring unit of the memory address accesses by the application based on the determined risk level of the application comprises:
    enabling one or more address monitoring units of the selected one or more computing device memory hierarchy layers to monitor the memory address accesses of the application based on the determined risk level of the application.

18. The non-transitory processor-readable storage medium of claim 15, wherein the stored processor-executable software instructions are configured to cause a processor to perform operations such that determining a risk level of an application running on a computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
    generating a behavior vector based on the memory address accesses of the application;
    applying one or more classifier models to the generated behavior vector; and
    determining the risk level of the application based on a result of applying the one or more classifier models to the generated behavior vector.

19. The non-transitory processor-readable storage medium of claim 18, wherein the stored processor-executable software instructions are configured to cause a processor to perform operations such that generating a behavior vector based on the memory address accesses of the application comprises generating a behavior vector based on context information related to the memory accesses of the application.

20. The non-transitory processor-readable storage medium of claim 15, wherein the stored processor-executable software instructions are configured to cause a processor to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
    inferring unobserved memory accesses of the application based on the memory address events and the received context information.

21. The non-transitory processor-readable storage medium of claim 15, wherein the stored processor-executable software instructions are configured to cause a processor to perform operations such that the stored processor-executable software instructions are configured to cause a processor to perform operations such that determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:

inferring unobserved application behavior based on the memory address events and the received context information.

22. A mobile computing device, comprising:
means for determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses; and
means for selecting one or more of the computing device memory hierarchy layers for monitoring by the respective address monitoring unit of the memory address accesses by the application based on the determined risk level of the application.

23. The computing device of claim 22, wherein means for determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
means for receiving from the address monitoring unit memory access events characterizing memory accesses by the application running on the computing device; and
means for determining the risk level of the application based on received memory access events.

24. The computing device of claim 22, wherein means for selecting one or more of the computing device memory hierarchy layers for monitoring by the respective address monitoring unit of the memory address accesses by the application based on the determined risk level of the application comprises:
means for enabling one or more address monitoring units of the selected one or more memory hierarchy layers to monitor the memory address accesses of the application based on the determined risk level of the application.

25. The computing device of claim 22, wherein means for determining a risk level of an application running on a computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
means for generating a behavior vector based on the memory address accesses of the application;
means for applying one or more classifier models to the generated behavior vector; and
means for determining the risk level of the application based on a result of applying the one or more classifier models to the generated behavior vector.

26. The computing device of claim 22, wherein means for determining a risk level of an application running on the computing device based on memory address accesses by the application of one or more computing device memory hierarchy layers that are each monitored and characterized by a respective address monitoring unit associated with the one or more computing device memory hierarchy layers and context information that is correlated with the memory address accesses comprises:
means for inferring unobserved memory accesses of the application based on the memory address events and the received context information.

* * * * *